(12) United States Patent
Freedman et al.

(10) Patent No.: US 8,893,850 B2
(45) Date of Patent: *Nov. 25, 2014

(54) ACOUSTICAL VINYL FLOORING AND METHODS OF MANUFACTURE

(71) Applicants: Michael Freedman, Morganville, NJ (US); Dale Tucker, Atlanta, GA (US)

(72) Inventors: Michael Freedman, Morganville, NJ (US); Dale Tucker, Atlanta, GA (US)

(73) Assignee: Michael Freedman & Associates, Inc., Edison, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/134,133

(22) Filed: Dec. 19, 2013

(65) Prior Publication Data

US 2014/0106158 A1 Apr. 17, 2014

Related U.S. Application Data

(63) Continuation of application No. 13/468,103, filed on May 10, 2012, now Pat. No. 8,640,824.

(51) Int. Cl.
*E04B 1/82* (2006.01)
(52) U.S. Cl.
USPC ............................................ 181/290; 181/284
(58) Field of Classification Search
USPC .................................................. 181/290, 284
See application file for complete search history.

(56) References Cited

U.S. PATENT DOCUMENTS

| 4,457,120 | A | * | 7/1984 | Takata | 52/309.4 |
| RE41,945 | E | * | 11/2010 | Downey | 52/144 |
| 8,113,495 | B2 | | 2/2012 | Downey | |
| 8,240,430 | B2 | | 8/2012 | Downey | |
| 8,640,824 | B2 | * | 2/2014 | Freedman et al. | 181/290 |
| 2006/0037815 | A1 | * | 2/2006 | Schabel | 181/290 |
| 2006/0130416 | A1 | | 6/2006 | Mohr et al. | |
| 2010/0007047 | A1 | * | 1/2010 | Lau | 264/239 |
| 2010/0106464 | A1 | | 4/2010 | Hlasny et al. | |
| 2010/0288582 | A1 | * | 11/2010 | May et al. | 181/286 |
| 2010/0319282 | A1 | | 12/2010 | Ruland | |
| 2012/0167370 | A1 | * | 7/2012 | Kuepfer et al. | 29/428 |
| 2012/0276348 | A1 | * | 11/2012 | Clausi et al. | 428/196 |

FOREIGN PATENT DOCUMENTS

| EP | 1001111 A2 | 5/2000 |
| JP | 09151596 A | 6/1997 |

OTHER PUBLICATIONS

International Search Report and Written Opinion dated Aug. 22, 2014, from corresponding PCT/US2014/031413, filed Mar. 21, 2014 (eleven (11) sheets).

* cited by examiner

*Primary Examiner* — Forrest M Phillips
(74) *Attorney, Agent, or Firm* — Kacvinsky Daisak Bluni PLLC

(57) ABSTRACT

An acoustical vinyl tile having an integral acoustical layer is disclosed. The vinyl tile includes a vinyl portion, an acoustical portion, and an adhesive layer for fixing the vinyl portion to the acoustical portion. The acoustical portion comprises a crumb rubber component and a polyurethane foam component. The acoustical portion can include 10-40% crumb rubber and 60-90% polyurethane foam. The resulting vinyl tile meets ASTM E 2179 IIC sound requirements. A method of making a vinyl tile meeting the ASTM sound requirements is also disclosed. The method includes providing a vinyl slab portion, providing an acoustical slab portion comprising crumb rubber, polyurethane foam and a resin binder; and bonding the vinyl slab portion to the acoustical portion. Other embodiments are described and claimed.

20 Claims, 7 Drawing Sheets

ACOUSTICAL VINYL FLOORING AND METHODS OF MANUFACTURE

CROSS-REFERENCE TO RELATED APPLICATIONS

This is a continuation of pending U.S. Non-provisional patent application Ser. No. 13/468,103, filed May 10, 2012, the entirety of which application is incorporated by reference herein.

FIELD OF THE DISCLOSURE

The present disclosure relates to vinyl flooring systems in general, and more particularly to an improved vinyl tile having enhanced performance and acoustical properties coupled with improved long term stability.

BACKGROUND OF THE DISCLOSURE

Vinyl flooring has been a popular floor covering material for many years. Vinyl flooring is typically available in either tile or sheet form for both commercial and residential use. As finished flooring material, vinyl tile has been used extensively in commercial, institutional and public building applications, such as, for example, malls, schools, healthcare facilities, convention and exposition centers, civic buildings, private office buildings, sports facilities, and so forth. Vinyl flooring is durable, easy to maintain and is often more moisture-resistant than many alternative flooring materials. Vinyl flooring can also have acoustical properties such in that the material offers some rebound or resilience upon compression (i.e., when walked on).

Vinyl tiles can be composed of colored vinyl formed into generally planar solid sheets by heat and pressure, and cut into squares or other shapes. Manufacturers have created vinyl tiles that very closely resemble wood, stone, terrazzo, and concrete. Tiles are typically applied to a smooth, leveled bare floor or sub-floor usually using a suitable adhesive.

Conventional vinyl tiles are often installed over an acoustical base layer such as rubber or cork. The acoustical layer can serve one or more of a variety of different functions in a given installation. In some installations, the function of the underlayment material is to provide a cushioning effect to the floor system. In other situations, the function of the underlayment material is to compensate for imperfections in the surface of the subfloor, which can be concrete, plywood, or a number of other different materials that are commonly used and known. Another function of the underlayment, which is particularly pertinent to the present invention, is to reduce the transmission of sound through the floor to a room below in a multi-floor building. This is particularly significant where the maximum allowable level of sound transmission is controlled by local building codes, which is increasingly common.

In such cases, the acoustical base layer may be adhered to the sub-floor, and the vinyl tiles may be installed over the acoustical base layer, again using an adhesive. Many conventional commercially available adhesive materials are chemically incompatible with vinyl polymers and will in some instances not provide the necessary long-term adhesion. In even more extreme cases, certain adhesives will chemically react with the vinyl polymers resulting in discoloration and/or degradation of the vinyl tiles. Moreover, breakdown of the adhesive bond between the acoustical base layer and the vinyl tile can lead to increased noise, which as previously noted, can be a problem in multi-family dwellings.

Thus, there is a need for an improved vinyl tile having improved long term stability as compared to conventional vinyl tiles and vinyl flooring systems. The improved vinyl tile should also provide a desired resilience, with exceptional sound dampening properties that meet applicable acoustical limitations associated with multi-family dwellings. The improved vinyl tile should also be easy to manufacture and install. These and a number of additional objectives are met by the disclosed vinyl tile.

SUMMARY OF THE DISCLOSURE

The disclosed system and method include an improved vinyl tile having enhanced stability, resilience and acoustical properties. The disclosed vinyl tile incorporates a durable bond between the vinyl and acoustical material layers to ensure long term stability and performance. Some embodiments of the disclosed vinyl tile may also include an anti-fungal compound mixed with some or all of the tile raw materials to inhibit growth of fungus.

In some embodiments, a sound dampening material is bonded to a vinyl tile slab prior to cutting the product into tiles or planks. The formulation of the acoustical sound dampening material may be selected to be compatible with the adhesive used to fix the material to the vinyl tile slab. Such a formulation may ensure a good long term bond between the sound dampening material and the vinyl tile slab. The acoustical sound dampening material may also be selected to be compatible with the vinyl tile slab material, which may reduce or eliminate discoloration of the vinyl tile over the lifetime of the flooring system. Embodiments of the disclose tile incorporate the aforementioned chemical compatibility while still providing desired acoustical properties. The disclosed vinyl tiles may find application in multi-family housing developments, which as previously noted can benefit greatly from the associated sound dampening properties.

A vinyl tile is disclosed. The vinyl tile includes a vinyl portion, an acoustical portion, and an adhesive layer for fixing the vinyl portion to the acoustical portion. The acoustical portion comprises a crumb rubber component and a polyurethane foam component. In some embodiments, the acoustical portion comprises 10-40% crumb rubber and 60-90% polyurethane foam. The acoustical portion may further comprise a resin binder. The vinyl portion may comprise polyvinylchloride.

The vinyl tile may further include a wear layer disposed on a surface of the vinyl portion. The vinyl portion may comprise a vinyl backing layer, a print layer and a clear wear layer. The vinyl backing layer, the print layer and the clear wear layer are bonded together via hot mold compression.

A vinyl tile is disclosed. The vinyl tile includes a vinyl portion, and an acoustical portion comprising a crumb rubber portion, a polyurethane foam portion, and a resin binder. A polyurethane adhesive layer may be interposed between the vinyl portion and the acoustical portion. The acoustical portion may comprise 10-40% crumb rubber and 60-90% polyurethane foam. In some embodiments, the vinyl portion comprises polyvinylchloride. A wear layer may be disposed on a surface of the vinyl portion. The vinyl portion may comprise a vinyl backing layer, a print layer and a clear wear layer. The vinyl backing layer, the print layer and the clear wear layer may be bonded together via hot mold compression.

A method of making a vinyl tile is disclosed. The method may include: providing a vinyl slab portion; providing an acoustical slab portion comprising crumb rubber, polyurethane foam and a resin binder; and bonding the vinyl slab portion to the acoustical portion. Providing a vinyl slab portion may comprise stacking a vinyl backing layer, a print film layer, and a clear wear layer on top of a moldboard and molding the layers together using a hot press. Providing an acoustical slab portion may comprise mixing the crumb rubber, the polyurethane foam and the resin binder; curing the mixture; cooling the cured mixture to form a cooled roll; and cutting a layer from the cooled roll.

The method may also include coating the vinyl slab portion with a polyurethane layer. Bonding the vinyl slab portion to the acoustical portion may comprise applying a polyurethane adhesive to a surface of the acoustical slab portion; applying the vinyl slab portion to the adhesive coated surface of the acoustical slab portion; and applying force to the acoustical slab portion and the vinyl slab portion for a predetermined time. The method may also include pressing the bonded vinyl slab portion and the acoustical slab portion in a press having die, the die cutting the slab into vinyl tiles of a predetermined shape and size. In some embodiments, the vinyl slab portion may comprise polyvinylchloride.

BRIEF DESCRIPTION OF THE DRAWINGS

By way of example, a specific embodiment of the disclosed vinyl tile will now be described, with reference to the accompanying drawings, in which.

DETAILED DESCRIPTION

The disclosed vinyl tile comprises a vinyl layer with an integrated sound reducing underlayment permanently attached thereto. The resulting vinyl tile meets ASTM E 2179 IIC sound requirements. The disclosed vinyl tile also eliminates the two step installation process associated with prior vinyl tile flooring systems which require installing an underlayment to the subfloor using a first adhesive, then installing the vinyl tile over the underlayment using a second adhesive. The disclosed tile thus reduces the total time required for installation. In some embodiments, the disclosed vinyl tile includes a combined 60% recycled content. In other embodiments, the disclosed vinyl tile includes an antifungal compound to inhibit the growth of fungus.

Figure 1:
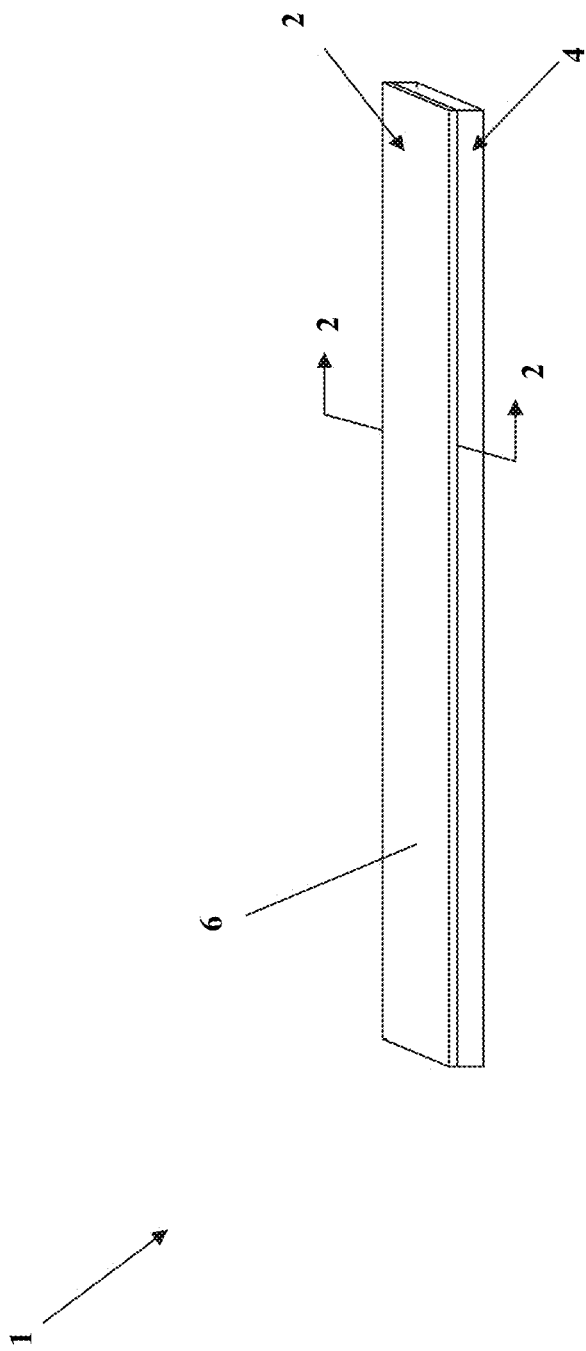
FIG. 1 is an isometric view of an embodiment of an exemplary vinyl tile according to the disclosure.

Referring now to FIG. 1, an exemplary vinyl tile 1 includes an upper vinyl portion 2 and a lower acoustical portion 4. The vinyl tile 1 is shown as having a rectangular plank shape. It will be appreciated, however, that it can be manufactured in any of a variety of desired geometric and non-geometric shapes. Non-limiting examples of such shapes include rectangular planks with a width of 4-inches and a length of 36-inches, rectangular planks with a width of 6-inches and a length of 36-inches, and 18-inch by 18-inch square shapes.

The vinyl portion may include a surface wear layer 6 to enhance the wear life of the vinyl portion 2. The surface wear layer 6 may have a thickness of about 0.005-inches (5 mils) to about 30 mils. In one embodiment, the surface wear layer may be about 8 mils. The surface wear layer 6 may comprise polyvinyl chloride (PVC). In one non-limiting exemplary embodiment, the surface wear layer 6 includes at least 90% PVC.

The vinyl portion 2 may comprise a polyvinylchloride (PVC) material, while the acoustical portion 4 may comprise a combination of crumb rubber and polyurethane. The inventor has found that incorporating polyurethane into the acoustical layer, in combination with the crumb rubber component, enhances compatibility between the acoustical portion 4 and the vinyl portion 4. In one non-limiting exemplary embodiment, the acoustical portion comprises about 10-40% crumb rubber, about 60-90% polyurethane foam, and a resin binder. In some embodiments the crumb rubber component is obtained from recycled tires or sneaker rubber. The polyurethane foam may be an appropriate open cell or closed cell foam. The resin binder may be a polyurethane binder.

Figure 2:
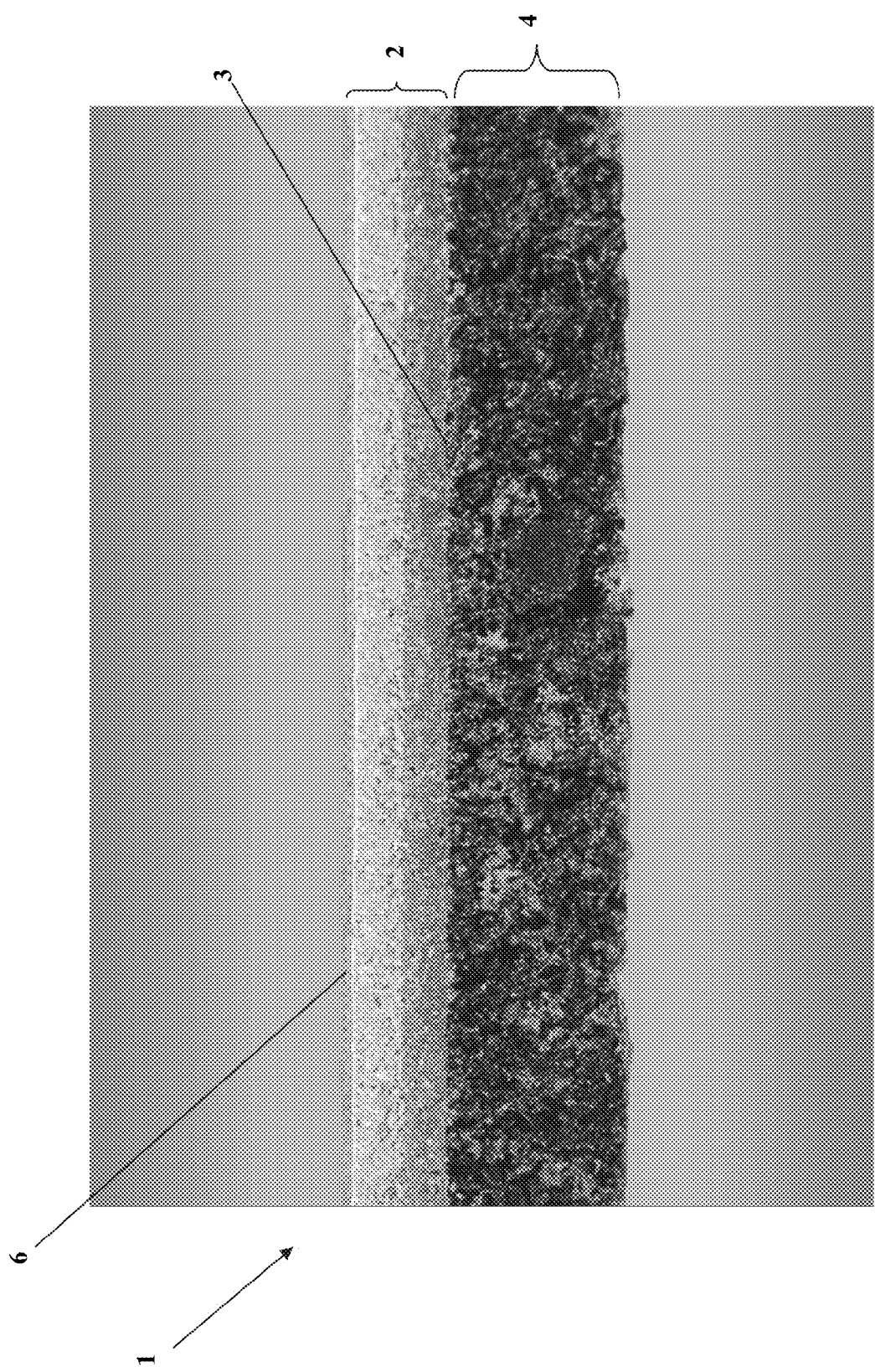
FIG. 2 is a cross-section view of the vinyl tile of FIG. 1.

FIG. 2 shows a cross-section of the vinyl tile 1 including vinyl portion 2, adhesive layer 3, acoustical portion 4 and surface wear layer 6. In one embodiment, the vinyl portion 2 has a thickness of about 2 millimeters (mm), the acoustical portion 4 may have a thickness of about 3 mm, and the surface wear layer may be about 0.008 inches or about 0.012 inches. In other embodiments, the vinyl portion 2 has a thickness of about 3 millimeters (mm), while the acoustical portion 4 may have a thickness of about 3 mm, and the surface wear layer 6 may be about 0.022 inches. These thicknesses are not critical, and other thicknesses may be selected for each portion. As will be described in greater detail later, the acoustical portion 4 is permanently bonded to the vinyl portion 2 using an adhesive that is highly compatible both with the vinyl portion 2 and the acoustical portion 4. Moreover, the acoustical portion 4 may also be highly compatible with the vinyl portion to reduce the chances for delamination and/or degradation of the vinyl portion 2 from the acoustical portion 4 during use. The total thickness of the resulting vinyl tile 1 may be about 5 mm (0.20-inch) and may develop an IIC in accordance with ASTM E 2179 of greater than 52.

Figure 3:
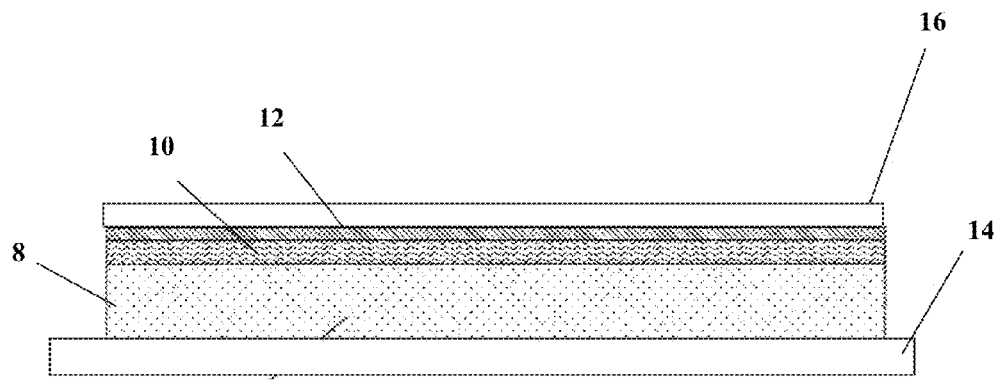
FIG. 3 is an exemplary stack-up of layers in a portion of the vinyl tile of FIG. 1.
Figure 4:
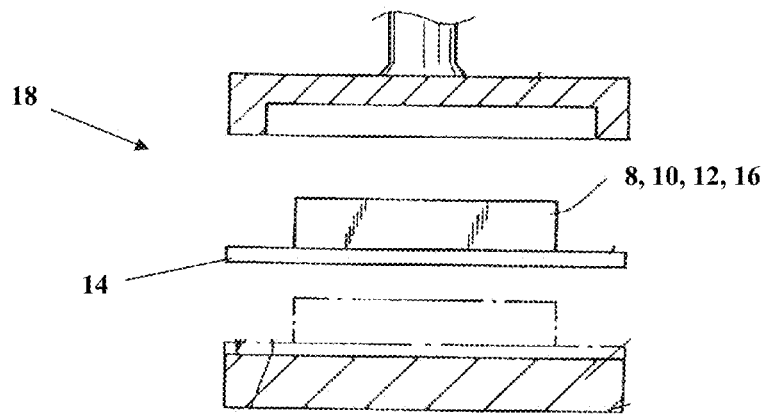
FIG. 4 is a schematic of a molding apparatus for forming a portion of the vinyl tile of FIG. 1.
Figure 5:
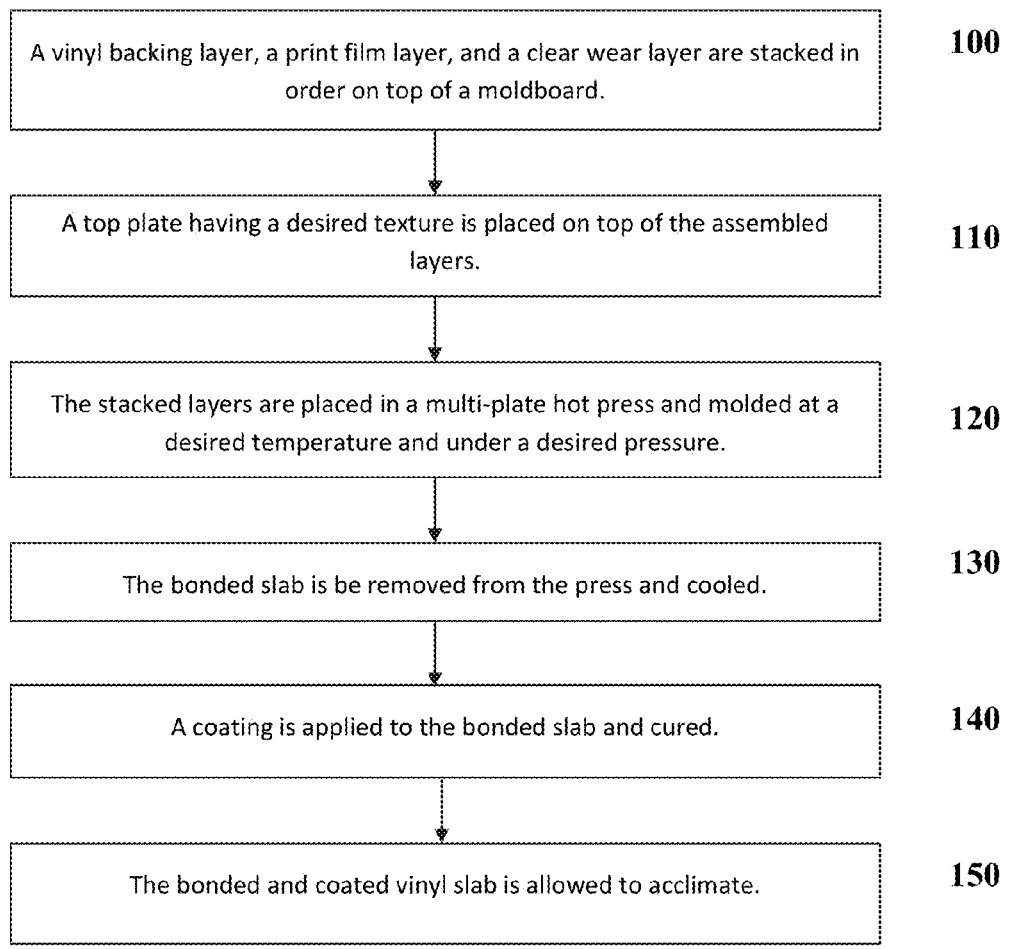
FIG. 5 is a flow chart illustrating an exemplary method of manufacturing the vinyl tile of FIG. 1.
Figure 6:
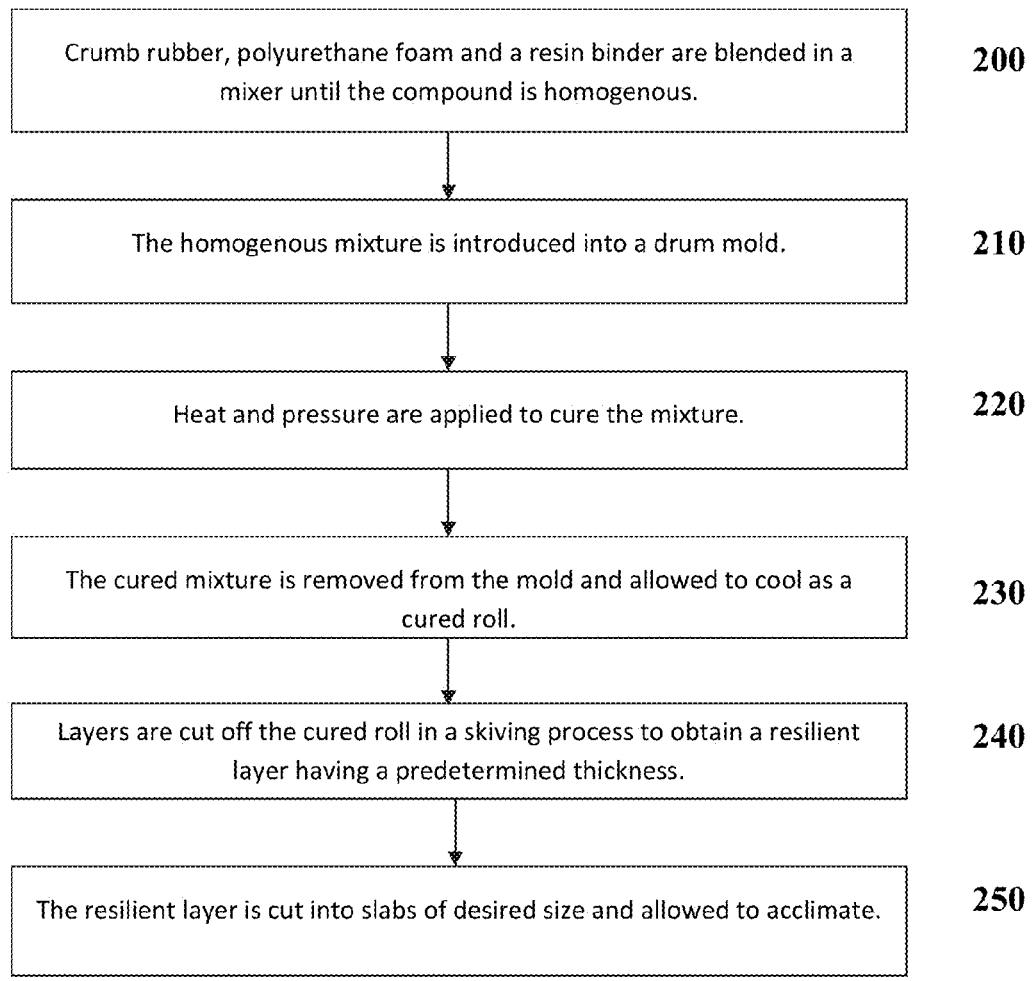
FIG. 6 is a flow chart illustrating an exemplary method of manufacturing the vinyl tile of FIG. 1.
Figure 7:
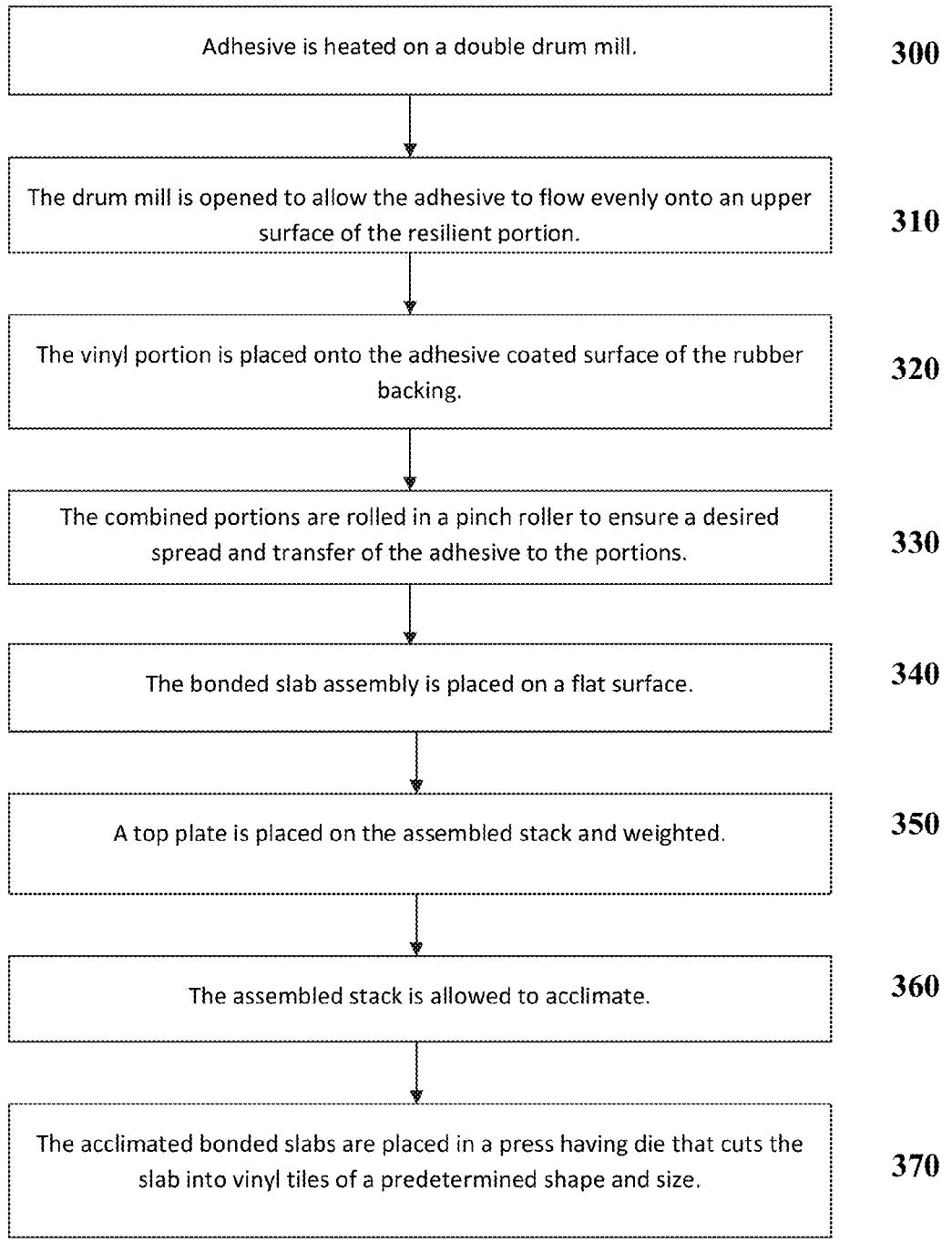
FIG. 7 is a flow chart illustrating an exemplary method of manufacturing the vinyl tile of FIG. 1.

A method for manufacturing the exemplary vinyl tile 1 will now be described in relation to FIGS. 3-7. The vinyl portion 2 may include a vinyl backing layer 8, a print film layer 10 applied over the backing layer, and a clear wear layer 12 applied over the print film layer 10 (FIG. 3). In one embodiment the vinyl backing layer 8 is PVC, the print film layer is 10 and the clear wear layer 12 are PVC. At step 100 (FIG. 5), the layers 8, 10, 12 may be stacked in order on top of a moldboard 14. At step 110, a top plate 16 having a desired texture may be placed on top of the assembled layers. This process may be repeated as desired. At step 120 the assembled layers 8, 10, 12 may be placed in a multi-plate hot press 18 (FIG. 4) and molded at a desired temperature and under a desired pressure for a desired time. The temperature may be from about 175 degrees F. to about 325 degrees F. The pressure may be from about 250 psi to about 350 psi. The time may be from about 8 minutes to about 16 minutes. At step 130 the bonded slab may be removed from the press and cooled. At step 140 a polyurethane or other coating may then be applied to an upper surface of the vinyl portion 2 and cured with ultraviolet light or other appropriate curing technique. At step 150 the bonded and coated vinyl slab (now vinyl portion 2) may be allowed to acclimate at 68 degrees Fahrenheit (+/−5 degrees F.) for about 48 hours.

As previously noted, the acoustical portion 4 may comprise a crumb rubber component, a polyurethane foam component, and a resin binder. In one exemplary embodiment the base acoustical material may be compounded to consist of 10 to 40 parts crumb rubber, 60 to 90 parts polyurethane foam and a resin binder. At step 200, the mixture may be blended in a mixer until the compound is homogenous. In some embodiments, the crumb rubber and polyurethane may be recycled from post industrial or post consumer materials. At step 210 (FIG. 6), the mixture may be introduced into a drum mold. At step 220, heat and pressure may be applied to cure the mixture. In some embodiments the temperature may be up to about 450 degrees F., the pressure may be up to about 1,200 psi, and the curing time may be up to about 90 minutes. At step 230, the cured mixture may be removed from the mold and allowed to cool as a cured roll. At step 240 layers are cut off the cured roll in a skiving process to obtain an acoustical layer 4 having a thickness of about 0.118-in (3 mm). The acoustical layer 4 may then be cut into slabs of desired size and allowed to acclimate at 68 degrees F. (+/−5 degrees F.) for about 48 hours. The acoustical portion 4 may be stored in the same location as the vinyl portion 2 so that the portions acclimate together.

The vinyl portion 2 and acoustical portion 4 may then be bonded together using a suitable adhesive. At step 300 (FIG. 7), the adhesive may be heated on a double drum mill to allow the carrier to flash more quickly. In one embodiment the adhesive is a polyurethane adhesive, which may prevent any reaction between the acoustical layer 4 and the vinyl portion 2. At step 310, the drum mill is opened to allow the adhesive to flow evenly onto an upper surface of the acoustical portion 4 as the acoustical portion 4 passes under the mill opening. To facilitate this, the acoustical portion 4 may be carried along on an open metal belt conveyer. At step 320, the vinyl portion 2 may be placed onto the adhesive coated surface of the rubber backing and, at step 330, the combined portions may be rolled in a pinch roller to ensure a desired spread and transfer of the adhesive to the adjoining surfaces of the portions 2, 4. In one embodiment, the pinch roller applies a pressure of about 150 psi to the combined portions. At step 340, the bonded slab assembly (containing bonded layers 2, 4) may then be placed on a flat surface. This process may be repeated until a desired quantity of bonded slab assemblies is produced or a maximum height of 38 inches is achieved. At step 350, a top plate may be placed on the assembled stack and weighted. At step 360, the assembled stack may be allowed to acclimate at 68 degrees F. (+/−5 degrees F.) for about 48 hours. This acclimation may allow the bonded assembly to equalize any stress in the material prior to cutting to size. This acclimation may also facilitate the dimensional stability of the finished product. At step 370 the acclimated bonded slabs may be inspected and placed in a press, which in one embodiment is a 150 ton clicker press. The press may have a die installed that cuts the slab into vinyl tiles 1 of a predetermined shape and size. Each cut vinyl tile may then be inspected visually for pattern and surface defects. The cut pieces can be placed on a smooth glass surface and inspected for gauge. The cut and inspected vinyl tiles 1 may then be packaged and stored for use.

Testing

Impact Sound Transmission Test and Classification was performed on an exemplary vinyl tile 1 installed over a wood joist floor/ceiling assembly. The specimen was tested in accordance with the American Society for Testing and Materials (ASTM) designation ASTM E492-09, titled "Standard Test Method for Laboratory Measurement of Impact Sound Transmission Through Floor-Ceiling Assemblies Using the Tapping Machine." It was classified in accordance with ASTM E989-06, entitled, "Standard Classification for Determination of Impact Insulation Class (IIC)".

This method measures the impact sound transmission performance of a floor/ceiling assembly, in a controlled laboratory environment. A standard tapping machine (B & K Type 3207) was placed at four positions on a test floor that forms the horizontal separation between two rooms, one directly above the other. The data obtained was normalized to a reference room absorption of 10 square meters in accordance with the test method.

The standard also prescribes a single-figure classification rating called "Impact Insulation Class, IIC" which can be used by architects, builders and code authorities for acoustical design purposes in building construction.

The IIC is obtained by matching a standard reference contour to the plotted normalized one third octave band sound pressure levels at each test frequency. The greater the IIC rating, the lower the impact sound transmission through the floor-ceiling assembly.

The test floor consisted of a 100 sq. ft. opening that forms the horizontal separation of the two rooms, one directly above the other. The structural members are open webbed wood floor trusses, 16 inches deep installed 24 inches on center. The sub flooring is ⅝ inch thick plywood. The bridging is a continuous 2×4 nailed to the bottom chord and the sides of the diagonals with 2 inch long nails. Single leaf RC-1 acoustical channels (2½ inch×½ inch) were spaced 16 inches on center and attached to the bottom chord by screws. The insulation is 5½ inches of fiberglass. The ceiling is gypsum board, ⅝ inches thick, with the long edges located between the joists perpendicular to the acoustical channels. Short edges are staggered by 4 ft. Sheets are fastened to the acoustical channels by means of 1½ inch screws located ½ inch away from the edge and 3 inches from the long edges; screws are spaced 6 inches on center. Joints are taped and finished with two layers of compound.

The exemplary vinyl tile 1 measured 6 inches wide by 36 inches long by 0.20 inches thick. The flooring weighed 0.65 lbs/sq. ft.

Test Results

The data obtained in the room below the panel normalized to Ao=10 square meters, is as follows:

| ⅓ Octave Band Center Frequency Hz | ⅓ Octave Band Sound Pressure Level dB re 0.0002 Microbar |
|---|---|
| 100 | 66 |
| 125 | 60 |
| 160 | 60 |
| 200 | 62 |
| 250 | 63 |
| 315 | 61 |
| 400 | 60 |
| 500 | 56 |
| 630 | 49 |
| 800 | 40 |
| 1000 | 27 |
| 1250 | 22 |
| 1600 | 20 |
| 2000 | 18 |
| 2500 | 17 |
| 3150 | 13 |
| Impact Insulation Class (IIC) | 54 |

The 95% uncertainty level for each tapping machine location is less than 3 dB for the ⅓ octave bands centered in the range from 100 to 400 Hz and less than 2.5 dB for the bands centered in the range from 500 to 3150 Hz.

For the floor/ceiling construction, the 95% uncertainty limits for the normalized sound pressure levels were determined to be less than 2 dB for the ⅓ octave bands centered in the range from 100 to 3500.

Figure 8:
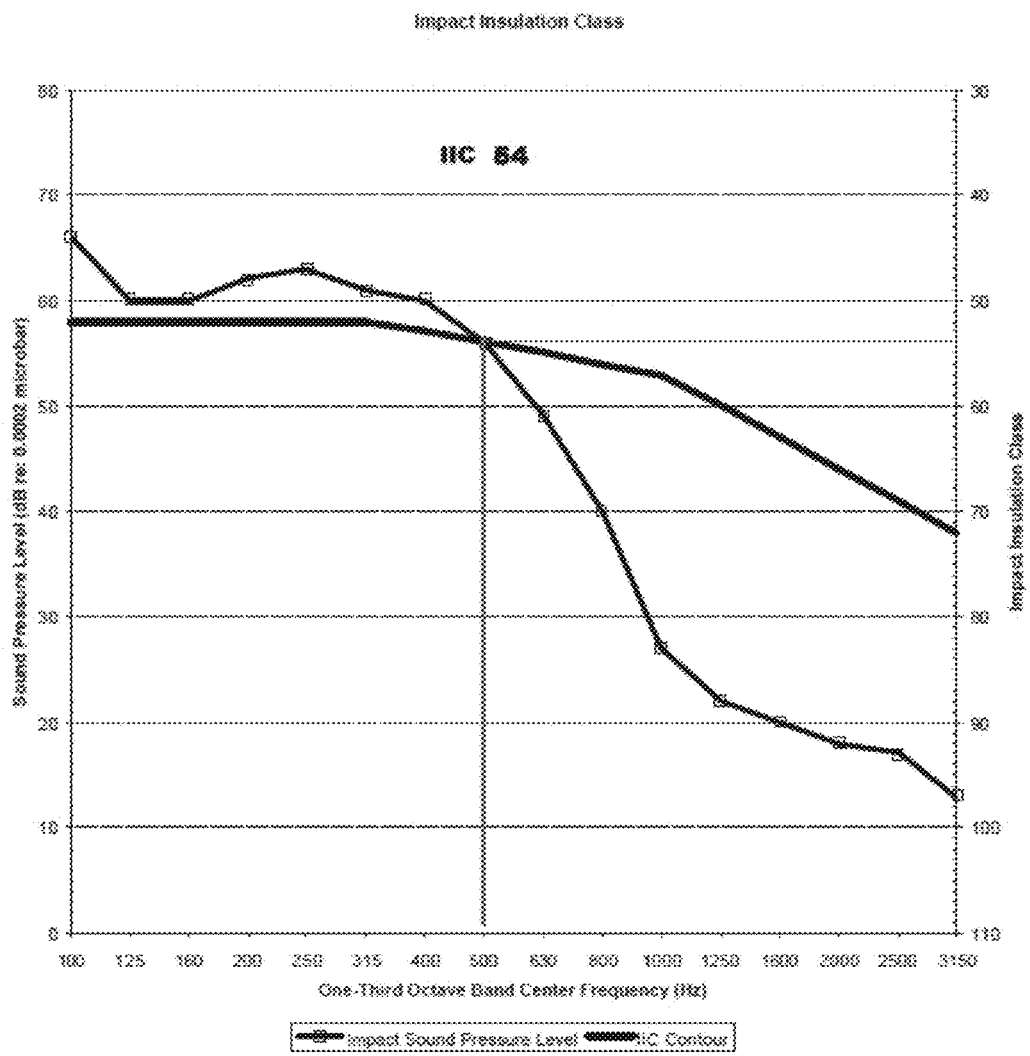
FIG. 8 is a graph showing impact sound pressure level measurements and ASTM 2179 IIC contour for the exemplary vinyl tile of FIG. 1.

FIG. 8 shows the results from testing in which impact sound pressure level and IIC contour are plotted for the exemplary vinyl tile 1. The generally accepted minimum passing limit for a floor ceiling assembly is an IIC of 50 or above. As can be seen, the exemplary vinyl tile 1 exhibited an IIC of 54.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. A vinyl tile, comprising:
a vinyl portion;
an acoustical portion comprising a mixture of rubber and polyurethane; and
an adhesive layer for fixing the vinyl portion to the acoustical portion;
wherein the vinyl tile installed on a floor/ceiling assembly provides the resulting assembly with an IIC, in accordance with ASTM E 2179, of 50 or greater.

2. The vinyl tile of claim 1, wherein the rubber comprises crumb rubber.

3. The vinyl tile of claim 2, wherein the polyurethane comprises a polyurethane foam.

4. The vinyl tile of claim 3, further comprising a resin binder in the mixture of rubber and polyurethane.

5. The vinyl tile of claim 1, wherein the mixture of rubber and polyurethane comprises 10 to 40 parts crumb rubber and 60 to 90 parts polyurethane foam, and a resin binder.

6. The vinyl tile of claim 1, wherein the adhesive layer comprises polyurethane adhesive.

7. The vinyl tile of claim 1, wherein the vinyl tile comprises at least 60% recycled content.

8. A vinyl tile, comprising:
a vinyl portion; and
an acoustical portion comprising a mixture of a rubber component, a polyurethane component, and a resin binder component; and
a polyurethane adhesive layer interposed between the vinyl portion and the acoustical portion.

9. The vinyl tile of claim 8, wherein the vinyl tile installed on a floor/ceiling assembly provides the resulting assembly with an IIC, in accordance with ASTM E 2179, of 50 or greater.

10. The vinyl tile of claim 8, wherein the vinyl tile comprises at least 60% recycled content.

11. The vinyl tile of claim 8, wherein the rubber component comprises crumb rubber and the polyurethane component comprises polyurethane foam.

12. The vinyl tile of claim 8, wherein the mixture comprises 10 to 40 parts crumb rubber, 60 to 90 parts polyurethane foam, and a resin binder.

13. The vinyl tile of claim 1, further comprising an antifungal compound to inhibit the growth of fungus.

14. A method of making a vinyl tile, comprising:
forming a vinyl slab portion;
forming an acoustical portion;
storing the vinyl slab portion and the acoustical portion in the same location for a first predetermined time period to allow the vinyl slab portion and the acoustical portion to acclimate together;
bonding the vinyl slab portion to the acoustical portion using an adhesive to form a bonded slab assembly;
stacking a plurality of said bonded slab assemblies to form an assembly stack;
storing the assembly stack for at least a second predetermined time period to allow the bonded slab assemblies to equalize stress in the components; and
cutting each of the bonded slab assemblies into vinyl tiles of a predetermined shape and size.

15. The method of claim 14, wherein forming a vinyl slab portion comprises bonding together a vinyl backing layer, a print film layer and a clear wear layer.

16. The method of claim 14, wherein forming an acoustical portion comprises:
mixing a rubber component and a polyurethane component to form a mixture;
molding the mixture to form a cured roll; and
cutting layers from the cured roll to obtain the acoustical portion.

17. The method of claim 16, wherein the mixture further comprises a resin binder.

18. The method of claim 14, wherein the first predetermined time period comprises at least 48 hours.

19. The method of claim 14, wherein the second predetermined time period comprises at least 48 hours.

20. The method of claim 14, wherein the step of storing the vinyl slab portion and the acoustical portion occurs at 68 degrees F. (+/−5 degrees F.), and the step of storing the assembly stack occurs at 68 degrees F. (+/−5 degrees F.).

* * * * *